United States Patent
Yaow et al.

[11] Patent Number: 5,896,811
[45] Date of Patent: Apr. 27, 1999

[54] YOGURT CULTIVATOR

[75] Inventors: Tzu-Chiang Yaow; Long-Huang Chang, both of Taipei Hsien, Taiwan

[73] Assignees: Soaring Benefit Ltd.; Long Huang Co., Ltd., both of Taipei Hsien, Taiwan

[21] Appl. No.: 09/188,906

[22] Filed: Nov. 10, 1998

[51] Int. Cl.[6] .................. A23L 1/00; A23G 9/00; A23C 23/00

[52] U.S. Cl. .............. 99/453; 99/483; 219/214; 219/386

[58] Field of Search .............. 99/452–455, 460, 99/467, 483, 468, 485, 341, 494, 516, 358; 219/421, 731, 734, 730, 214, 771, 778, 385, 491, 386, 633, 387, 441; 126/281, 273.5; 165/47, 61; 426/43, 61, 34, 234, 237, 241, 244; 435/832, 853, 885

[56] References Cited

U.S. PATENT DOCUMENTS

| | | | |
|---|---|---|---|
| 3,946,657 | 3/1976 | Driessen et al. | 99/455 |
| 4,009,368 | 2/1977 | Faivre et al. | 219/441 X |
| 4,022,914 | 5/1977 | Moody | 99/453 X |
| 4,091,119 | 5/1978 | Bach | 426/234 |
| 4,210,073 | 7/1980 | Weiss | 99/483 |
| 4,434,357 | 2/1984 | Simpson et al. | 165/61 X |
| 4,800,809 | 1/1989 | Boer | 99/453 |
| 4,838,154 | 6/1989 | Dunn et al. | 99/483 X |
| 5,573,693 | 11/1996 | Lorence et al. | 426/234 X |
| 5,607,613 | 3/1997 | Reznik | 99/358 X |
| 5,609,900 | 3/1997 | Reznik | 426/244 |
| 5,818,016 | 10/1998 | Lorence et al. | 99/453 |
| 5,829,344 | 11/1998 | Lande | 99/468 X |

*Primary Examiner*—Timothy F. Simone
*Attorney, Agent, or Firm*—Bacon & Thomas, PLLC

[57] ABSTRACT

A yogurt cultivator includes a heat insulative pan, a heat-resisting carrier plate mounted within the heat insulative pan, the heat-resisting carrier plate defining a plurality of cells for holding respectively a fermentation container that holds cow's milk and milk solids and bacteria for fermenting into yogurt, each cell having an annular inside flange, a plurality of heat conductive top plates and a plurality of electrically insulative bottom plates respectively mounted in the cells and fixedly fastened to the respective annular inside flanges at top and bottom sides, a plurality of ceramic heating plates respectively mounted in the cells within the respective annular inside flanges between the heat conductive top plates and the electrically insulative bottom plates and controlled to produce heat, and a transparent covering covered on the carrier plate.

2 Claims, 3 Drawing Sheets

YOGURT CULTIVATOR

BACKGROUND OF THE INVENTION

The present invention relates to a yogurt cultivator used to cultivate yogurt.

People may like to cultivate yogurt at home. When cultivating yogurt, powdered bacteria (*Lactobacillus bulgaricus* and *Streptococcus thermophilus*) and milk (fresh milk or powder milk with water) are mixed in a container, and then the container is put at room temperature for about 24 to 36 hours, enabling the mixture to be fermented into yogurt. This yogurt fermentation process takes much time.

SUMMARY OF THE INVENTION

The present invention relates to a yogurt cultivator which cultivate bacteria (*Lactobacillus bulgaricus* and *Streptococcus thermophilus*) in milk quickly, causing milk to be fermented into yogurt within a short period of time. According to the present invention, the yogurt cultivator comprises a heat insulative pan, a heat-resisting carrier plate mounted within the heat insulative pan, the heat-resisting carrier plate defining a plurality of cells for holding respectively a fermentation container that holds cow's milk and milk solids and bacteria for fermenting into yogurt, and a transparent covering for covering the carrier plate. Each cell of the carrier plate is mounted with a heat conductive top plate at the top side, an electrically insulative bottom plate at the bottom side, and a ceramic heating plate between the heat conductive top plate and the electrically insulative bottom plate. When a fermentation container is put in one cell in the carrier plate, the respective ceramic heating plate is turned on to produce heat, causing the milk and milk solids to be quickly fermented into yogurt.

DETAILED DESCRIPTION OF THE PREFERRED EMBODIMENT

Figure 1:
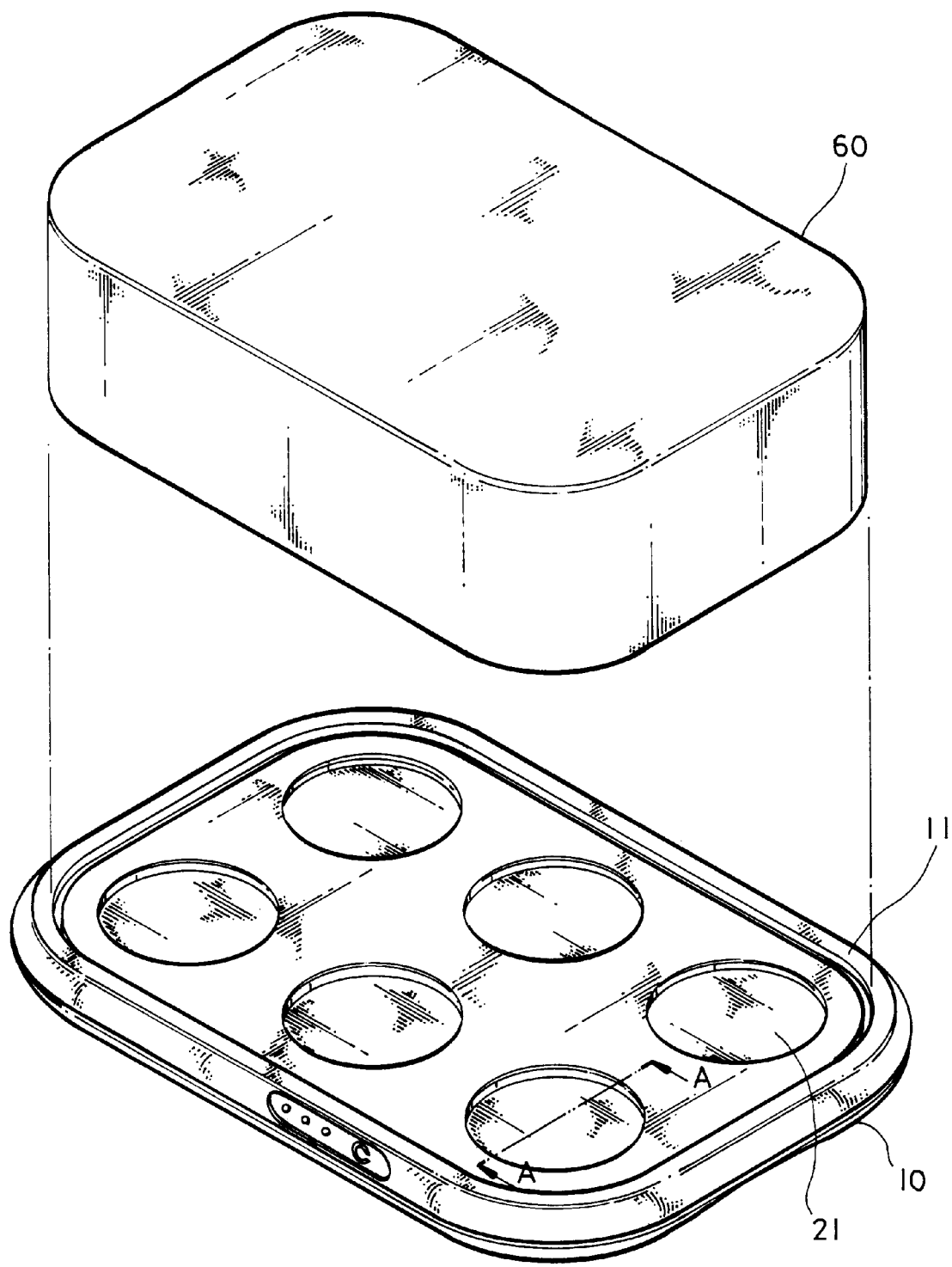
FIG. 1 is an exploded view of a yogurt cultivator according to the present invention.
Figure 3:
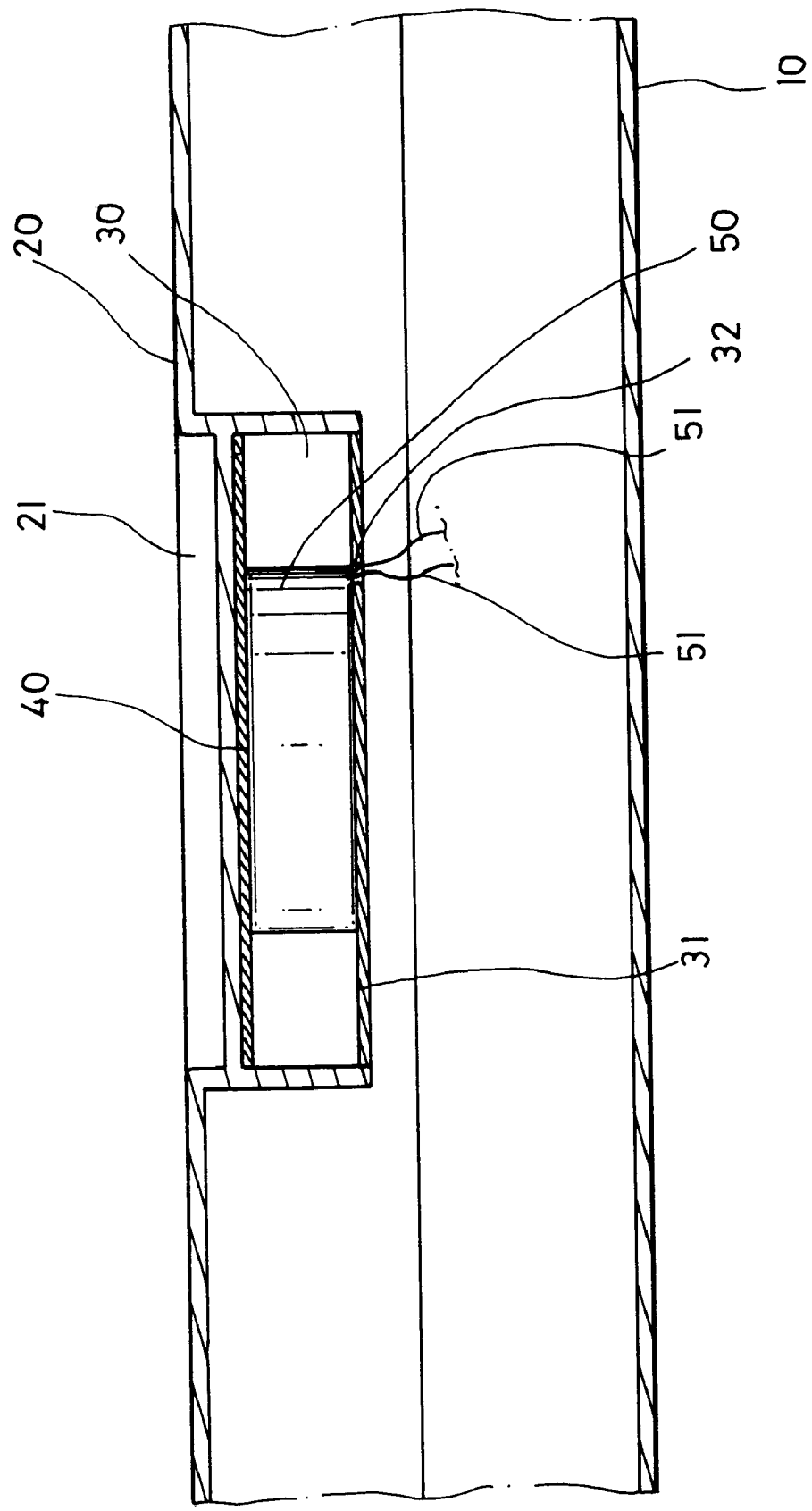
FIG. 3 is a sectional view in an enlarged scale taken along line A—A of FIG. 1.

Referring to FIGS. 1 and 3, a yogurt fungi cultivator in accordance with the present invention comprises a pan 10. The pan 10 is made of heat insulative material having for example a flat, rectangular shape. A carrier plate 20 is mounted within a recessed top receiving chamber 11 defined within the pan 10, and suspended above the bottom side wall of the pan 10. The carrier plate 20 is molded from heat-resisting plastics, comprising a plurality of cells 21.

Referring to FIG. 3 and FIG. 1 again, each cell 21 comprises an annular inside flange 30, an electrically insulative bottom plate 31 fixedly fastened to the annular inside flange 30 at the bottom, the electrically insulative bottom plate 31 having a wire hole 32, a heat conductive top plate (for example an aluminum plate) 40 fixedly fastened to the annular inside flange 30 at the top at an elevation lower than the top surface of the carrier plate 20, and a ceramic heating element (P.T.C.) 50 mounted within the annular inside flange 30 and firmly retained between the heat conductive top plate 40 and the electrically insulative bottom plate 31. The lead wires (neutral wire and hot wire) 51 of the ceramic heating element 50 are inserted through the wire hole 32 of the electrically insulative bottom plate 31 and connected to a power switch (not shown).

Referring to FIGS. 1 and 3 again, a transparent covering 60 is covered on the carrier plate 20 within the pan 10.

Figure 2:
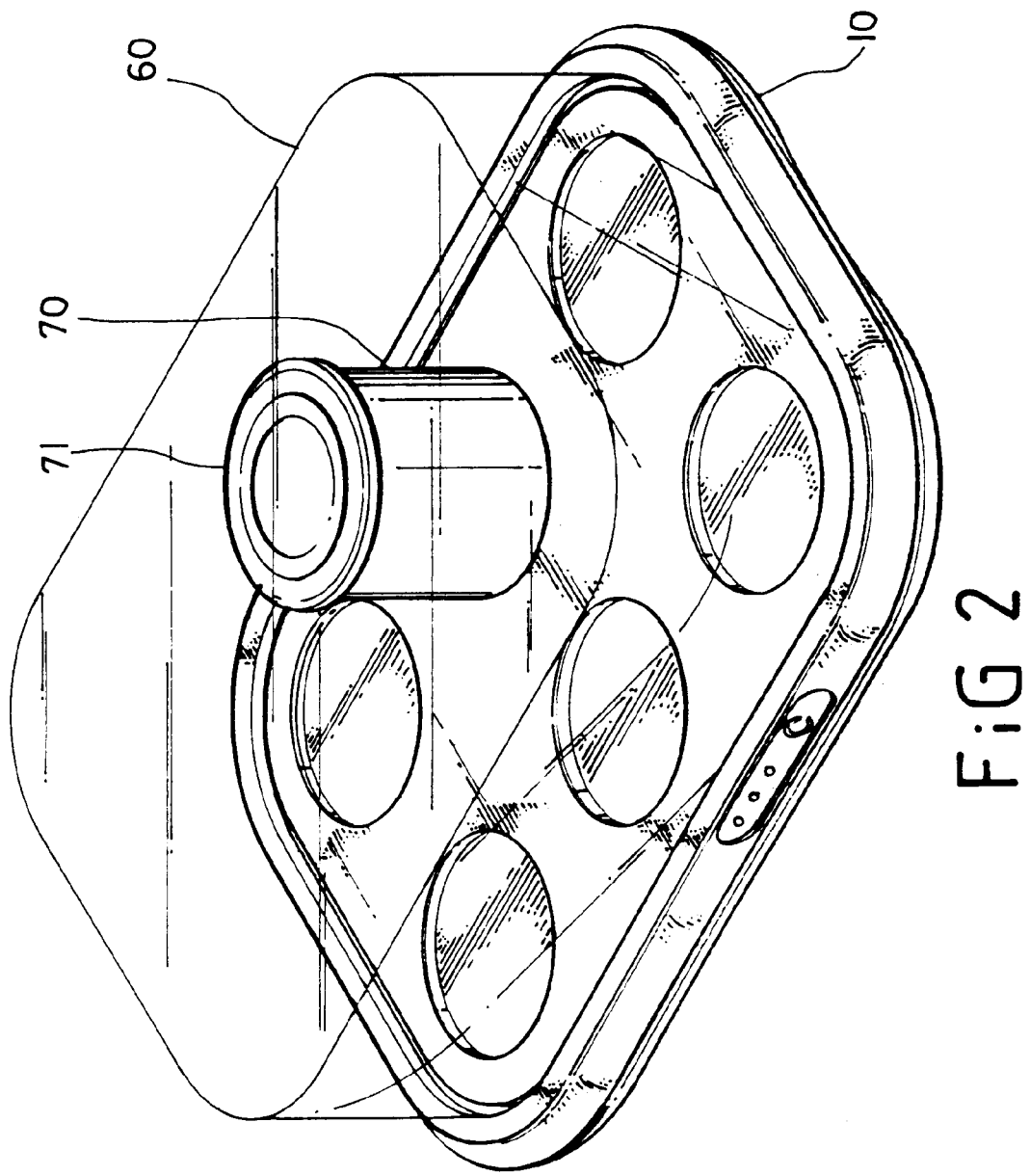
FIG. 2 is an applied view of the present invention, showing a fermentation container put in one cell in the carrier plate of the yogurt cultivator.

Referring to FIGS. 2 and 3 again, a fermentation container 70 can be put in one cell 21, and heated to cultivate yogurt. When whole or skimmed cow's milk and milk solids are put in the fermentation container 70, bacteria (*Lactobacillus bulgaricus* and *Streptococcus thermophilus*) are added to the milk and milk solids, then a lid 71 is covered on the fermentation container 70, and then the fermentation container 70 is put in one cell 21 in the carrier plate 20, and then the transparent covering 60 is covered on the carrier plate 20 within the pan 10. When the power switch is switched on, the ceramic heating plate 50 is turned on to produce heat, enabling heat to be transmitted through the heat conductive plate 40 to the fermentation container 70, causing the contained milk and milk solids to be fermented into yogurt.

While only one embodiment of the present invention has been shown and described, it will be understood that various modifications and changes could be made thereunto without departing from the spirit and scope of the invention disclosed.

What the invention claimed is:

1. A yogurt cultivator comprising:

a heat insulative pan;

a heat-resisting carrier plate mounted within said heat insulative pan, said heat-resisting carrier plate comprising a plurality of cells for holding respectively a fermentation container that holds cow's milk and milk solids and bacteria for fermenting into yogurt, said cells each comprising an annular inside flange;

a plurality of electrically insulative bottom plates respectively mounted in said cells and fixedly fastened to the respective annular inside flanges at a bottom side;

a plurality of heat conductive top plates respectively mounted in said cells and fixedly fastened to the respective annular inside flanges at a top side for holding a respective fermentation container in said cells;

a plurality of ceramic heating plates respectively mounted in said cells within the respective annular inside flanges between said heat conductive top plates and said electrically insulative bottom plates; and a transparent covering covered on said carrier plate.

2. The yogurt cultivator of claim 1 wherein said heat conductive top plates are aluminum plates.

* * * * *